(12) United States Patent
Schuengel

(10) Patent No.: US 12,224,852 B2
(45) Date of Patent: Feb. 11, 2025

(54) METHOD FOR DETERMINING A MASTER CLOCK IN A COMMUNICATION NETWORK

(71) Applicant: Robert Bosch GmbH, Stuttgart (DE)

(72) Inventor: Maximilian Schuengel, Darmstadt (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/936,432

(22) Filed: Sep. 29, 2022

(65) Prior Publication Data

US 2023/0114249 A1 Apr. 13, 2023

(30) Foreign Application Priority Data

Sep. 30, 2021 (DE) ...................... 10 2021 210 935.7

(51) Int. Cl.
*H04J 3/06* (2006.01)
*H04L 69/28* (2022.01)
*H04W 56/00* (2009.01)

(52) U.S. Cl.
CPC ............ *H04J 3/0658* (2013.01); *H04L 69/28* (2013.01); *H04W 56/0015* (2013.01)

(58) Field of Classification Search
None
See application file for complete search history.

(56) References Cited

U.S. PATENT DOCUMENTS

| | | | | |
|---|---|---|---|---|
| 9,380,548 B2* | 6/2016 | Shin | ................ | H04W 56/0065 |
| 2011/0161524 A1* | 6/2011 | Na | .................. | H04W 56/0015 |
| | | | | 709/248 |
| 2011/0170534 A1* | 7/2011 | York | .................. | H04J 3/0667 |
| | | | | 702/89 |
| 2012/0026951 A1* | 2/2012 | Mace | ............... | H04N 21/44016 |
| | | | | 370/329 |

(Continued)

OTHER PUBLICATIONS

Murakami et al., "A Master Redundancy Technique in IEEE 1588 Synchronization with a Link Congestion Estimation," 2010 IEEE International Symposium on Precision Clock Synchronization for Measurement, Control, and Communication, 2010, p. 30-35, DOI: 10.1109/ISPCS.2010.5609780.

(Continued)

*Primary Examiner* — Gregory B Sefcheck
(74) *Attorney, Agent, or Firm* — Maginot, Moore & Beck LLP

(57) ABSTRACT

The disclosure relates to a method for determining a master clock in a communication network having a plurality of stations that are communicatively connected to each other and each have a clock, wherein the master clock is used for time synchronization of the clocks of the stations, comprising the steps: determining by means of a model of the communication network, a synchronization path measure for each station to every other station of the stations, which specifies a synchronization accuracy between two stations; determining for each station on the basis of the synchronization path measure in each case a synchronization metric, (Continued)

which specifies a synchronization accuracy for this station; and determining on the basis of the synchronization metrics of all the stations the station whose clock is meant to be used as the master clock.

8 Claims, 2 Drawing Sheets

(56) References Cited

U.S. PATENT DOCUMENTS

| | | | |
|---|---|---|---|
| 2015/0207677 A1* | 7/2015 | Choudhury | H04L 41/0895 370/254 |
| 2016/0150451 A1* | 5/2016 | Barreto De Miranda Sargento | H04W 36/30 370/332 |
| 2016/0277138 A1* | 9/2016 | Garg | H04L 41/0816 |
| 2016/0294545 A1* | 10/2016 | Wong | H04J 3/0685 |
| 2017/0055235 A1* | 2/2017 | Rabii | H04N 21/4325 |
| 2017/0134499 A1* | 5/2017 | Moyer | H04N 21/43076 |
| 2017/0195110 A1* | 7/2017 | Ruffini | H04L 7/0016 |
| 2018/0013508 A1* | 1/2018 | Rabinovich | H04J 3/0667 |
| 2018/0059712 A1* | 3/2018 | Kazehaya | G06F 1/12 |
| 2018/0062780 A1* | 3/2018 | Shimizu | H04N 21/242 |
| 2019/0007919 A1* | 1/2019 | Petrus | H04W 56/0015 |
| 2019/0116021 A1* | 4/2019 | Tanwar | H04J 3/0673 |
| 2020/0413360 A1* | 12/2020 | Ruffini | H04W 72/541 |
| 2021/0141413 A1* | 5/2021 | Levi | G06F 1/14 |
| 2021/0226766 A1* | 7/2021 | Arunachalam | H04W 56/001 |
| 2021/0314132 A1* | 10/2021 | Schuengel | H04L 7/0025 |
| 2021/0328696 A1* | 10/2021 | Lv | H04J 3/0679 |

OTHER PUBLICATIONS

Jeon et al., "An Efficient Method of Reselecting Grand Master in IEEE 802.1AS," The 20th Asia-Pacific Conference on Communication (APCC 2014), 2014, p. 303-308, DOI: 10.1109/APCC.2014.7091652.

* cited by examiner

METHOD FOR DETERMINING A MASTER CLOCK IN A COMMUNICATION NETWORK

This application claims priority under 35 U.S.C. § 119 to application no. DE 10 2021 210 935.7, filed on Sep. 30, 2021 in Germany, the disclosure of which is incorporated herein by reference in its entirety.

TECHNICAL FIELD

The present disclosure relates to a method for determining a master clock in a communication network having a plurality of stations, each of which have a clock, and to a computing unit and a computer program for the implementation thereof.

BACKGROUND

Time synchronization is an important aspect in communication networks, in particular in the industrial sector. It can be used to provide a common time between all the stations (what are known as the network nodes), or their clocks, in the communication network (sometimes also referred to below just as the network). For example, this allows alignment of time-critical processes such as time-triggered data transmission across distributed systems in order to achieve reliable, limited, low latency, i.e. deterministic, communication.

Future convergent (or combined) wired and wireless communication networks, for instance for industrial communication (i.e. networks in which wired and wireless communication connections are jointly present and are used) can be achieved by, for example, the convergence (or combination) of Time-Sensitive Networking (TSN) and the 5G mobile radio standard. Based on the Precision Time Protocol (PTP) according to IEEE 1588, time synchronization in TSN networks can be defined by what is known as the generalized Precision Time Protocol (gPTP) given by IEEE 30 802.1AS. The 5G system (5GS) uses a telecommunications profile with PTP profile in order to synchronize its Radio Access Network (RAN) components (i.e. wirelessly linked stations), while it can use dedicated Radio Resource Control (RRC) or System Information Block (SIB) broadcasts to distribute the time information to the devices (stations) over the radio interface, i.e. to achieve time synchronization of the stations.

Irrespective of the specific PTP profile, it is possible to perform time synchronization of the stations, or of their clocks, in the communication network by means of what is known as a grandmaster (GM), i.e. a master clock. This is the clock of a station that is used to synchronize other (in particular all the other) stations, or their clocks. The grandmaster is used here as the time source in particular for a specific section, which extends, for instance, over the entire network or only over defined network segments.

PTP defines, for example, what is known as a Best Master Clock Algorithm (BMCA) for dynamically selecting the grandmaster in a given network. The BMCA does this by comparing static clock attributes of each node (station) in order to find the best grandmaster, i.e. the clock, or the station to which the clock belongs, that is meant to be used as the grandmaster. In particular in industrial networks, however, the grandmaster is often configured manually to avoid dynamic algorithms delaying network provisioning.

Configuring the grandmaster manually, however, is a source of errors because of potential misconfigurations, especially as selecting the grandmaster is not trivial in large industrial networks.

"Jeon et al., An Efficient Method of Reselecting Grand Master in IEEE 802.1AS, DOI 10.1109/APCC.2014.7091652", for example, describes a possible way of reselecting a grandmaster by using preconfigured sequence tables that define port states for fallback configurations of a grandmaster. "Murakami et al., A Master Redundancy Technique in IEEE 1588 Synchronization with a Link Congestion Estimation, DOI 10.1109/IS-PCS.2010.5609780", for example, proposes a BMCA which takes account of link congestion between master and slave nodes for selecting the grandmaster.

SUMMARY

According to the disclosure, a method for determining a master clock in a communication network, and a computing unit and a computer program for the implementation thereof, are proposed. The subject matter of the embodiments and of the description below contains advantageous embodiments.

The disclosure is concerned with communication networks (or networks) having a plurality of stations (or nodes). These stations are communicatively connected to each other (in other words connected for data transfer). Such connections may be wireless and/or wired. Although the disclosure, as explained later, is particularly suitable for networks in which there are wired and wireless communication connections between stations, it can also be employed in purely wireless or purely wired networks. Each of the stations in the network has a clock. An objective in such a network is to synchronize the clocks of the stations. One of the clocks here is selected as the master clock, which is used for time synchronization of the (remaining) stations (or of their clocks). For this purpose, the relevant station having the master clock sends, for example, a suitable synchronization message to the other stations. It should be mentioned at this point that it is also always possible for stations without a clock to be present, although they are then not relevant to time synchronization.

Various types of network, for instance in vehicles (automotive) or in industry (production plants or the like), are possible as the networks or communication networks here. The stations are, for instance, computing units such as control units or even computers; the clock may be integrated there, for instance in the form of a crystal oscillator, which allows a time measurement. Each station comprises at least one communications module in order to be able to communicate with at least one other station in a wireless and/or wired manner. Possible examples of the wired communication connections are Ethernet or buses such as CAN or Flexray; possible examples of the wireless communication connections are WLAN, Bluetooth or mobile radio such as 3G, 4G or 5G, for instance.

What is known as a Time-Aware Network (TAN), i.e. a network or communication network in which time synchronization is performed, comprises what are called Time-Aware Systems (TAS), i.e. stations or nodes that are communicatively connected to each other; the stations may be end nodes or intermediate nodes (bridges). In this case, the BMCA selects the best grandmaster (if applicable per time interval), and establishes a synchronization hierarchy, i.e. a type of tree structure, through a network by determining the port states of each station accordingly. The ports are the communication interfaces of a station, via which interfaces the messages are sent. This is specified, for instance, by IEEE 1588 and IEEE 802.1AS. Each station runs the BMCA individually in order to determine the states of its own port. The BMCA consists of a data set comparison algorithm and a state decision algorithm.

The data set comparison algorithm uses the information contained in what are known as announce messages in order to find the best port configuration. The announce messages are distributed from each station to every other station in a network or synchronization segment (i.e. a portion of a larger network in which the time is meant to be synchronized; this portion shall be understood below also to mean a network, however). The available information can be divided into specific categories. While the typically used fields "grandmasterPriority1", "grandmasterClockQuality", "grandmasterPriority2" and "grandmasterIdentity" describe device attributes of the stations, or of their clocks, a field "stepsRemoved" defines a topology feature.

The fields "grandmasterPriority1" and "grandmasterPriority2" can be used to prioritize a station for the grandmaster selection. The priority values are static and are manually configured. The field "grandmasterClockQuality" can differ. The source of time and frequency distributed by the grandmaster can be described by means of "clockClass". For example, IEEE 1588 provides different clock classes as a look-up table. An estimated value of the clock error can be specified by means of "clockAccuracy". For example, this is derived from the static "timeSource" attribute, and is suitable for comparing different clocks. An estimate of the clock variance can be specified by means of "offsetScaledLogVariance". In this case, the clock measures its variance and the variance of its current grandmaster online, so that this attribute can be compared with other clock variances. The field "grandmasterIdentity" is, for example, a unique identifier for distinguishing between announce messages and associated data sets. The field "stepsRemoved" can represent the number of nodes or stations by which the sender of the associated announce message is distant from the recipient. This field is incremented, for instance, at every intermediate station (intermediate node) along the transmission path.

A data set comparison works as follows: each station $v_i$ finds the best data set $DS_{i,p,best}$ for each of its ports $v_{i,p}$. The data set $DS_{i,p,best}$ is determined by the data set comparison algorithm, which compares the data sets of all qualified announce messages at port $v_{i,p}$. The station determines from all the data sets $DS_{i,p,best}$ the best overall data set $DS_{i,best}$ thereof, again using the data set comparison algorithm.

The state decision algorithm at a station $v_i$ uses the data sets $DS_{i,p,best}$, $DS_{i,best}$ and the local data set $DS_i$ to find the recommended port states. The station runs the state decision algorithm for each port $v_{i,p}$. The recommended port states can be master, slave or passive state. A master port distributes sync and follow-up messages; a slave consumes said messages. A passive port is used to avoid synchronization loops.

The BMCA, based on IEEE 1588 and IEEE 802.1AS, is primarily suited to wired networks having static network conditions, i.e. was developed for these. The BMCA selects the grandmaster, or the master clock, simply on the basis of a comparison of clock attributes. For example, a clock having the best priority "grandmasterPriority1" is selected as grandmaster irrespective of the actual clock accuracy. Since some of the clock attributes are configured manually, for instance the "grandmasterPriority1", this can result in manual misconfigurations, which can lead to unsuitable grandmaster selections. Network-related aspects are not taken into account.

For gPTP, the synchronization accuracy of a station depends not only on the clock accuracy of its clock but also on the synchronization path, i.e. a graph of the clocks and connections between the grandmaster and the station to be synchronized. It is therefore important to take into account all the synchronization paths arising from a grandmaster configuration. The integration of 5G with TSN, i.e. the convergence of wired and wireless networks, introduces, for instance, time-variant synchronization paths, which can differ in terms of transit time or packet error rate. In converged wired and wireless networks, the BMCA selects the clock having the best clock attributes. There are scenarios, however, in which the clock that has the best clock attributes does not deliver the best possible synchronization accuracy, for instance because of network-related aspects; for example this may be the case if a station is linked wirelessly and therefore may not be continuously available in some circumstances, for instance. Furthermore, the BMCA optimizes the grandmaster selection, possibly only ostensibly, with regard to the synchronization accuracy. If a convergent network scenario is considered that allows mobility, i.e. comprises wirelessly linked mobile stations, one aspect may be that the grandmaster selection is optimized in terms of availability. According to "Jeon et al." (as mentioned above), however, the BMCA needs a long recovery time, i.e. the time until a grandmaster can be reselected is relatively long. This would mean a long time without any working time synchronization if the station used as the grandmaster is not available, for instance as a result of a temporarily missing (or failed) communication connection.

Hence the following aspects are a disadvantage when selecting a grandmaster, or master clock, with the BMCA: the decision criteria that are taken into account, the type of the optimization objective, manual attribute configuration, and a slow grandmaster reselection.

Against this background, it is proposed to use a model of the communication network, by means of which are determined synchronization path measures, in particular synchronization path weights and synchronization path redundancy values, for each station, and then a synchronization metric for each station is determined on the basis thereof. All the synchronization metrics can then be used to determine the station whose clock is used, or is meant to be used, as the master clock (i.e. as the grandmaster).

Said network or communication network is represented in particular by a model in which the individual stations, or their clocks, are regarded as nodes, whereas (direct) communication connections between two stations are regarded as edges; as mentioned, such a communication connection may be wired or wireless. In principle, both variants could also be present for two stations, although they would then be represented as redundant connections and hence as different edges (see the statements below in this regard).

It is then possible to represent for each individual station, or its clock, a path or communication path to every other station; this path may run via one or more other stations, for instance. Such a path constitutes a synchronization path, via which, were one of these two stations to provide the master clock, the other of the two stations, or its clock, would later be synchronized. In particular a primary synchronization is considered here, which is the shortest, for example, although in particular the path that has the lowest path weights (in total). Specifically, depending on the situation, additional redundant paths may also be present that run, for instance, via another, intermediary station. A synchronization path measure is then determined for each pair of stations. This can be determined first for the primary path by, for example, allocating a weight to each station, or its clock, on the path or synchronization path (in particular this does not include the two stations being considered), likewise to each edge, i.e. each connection path between two adjacent stations on the synchronization path. By summing these weights, it is possible to form for one such synchronization path between two particular stations (i.e. the station regarded as the potential grandmaster and the station to be synchronized therewith) a measure that specifies a synchronization accuracy between these two stations: the aforementioned synchronization path measure. In particular for the edges, or connection paths, between two adjacent stations, the weight may depend on the type of the communication connection present there, for instance may be different for wireless and wired connections. For instance, the weight for a wireless connection may be higher, as there may be a certain probability of failure here. Likewise, however, the weight for a station that is mobile may be higher than for a stationary station, as again the connection may be problematic here.

As mentioned, for two particular stations, there may also be additional paths or synchronization paths, which are then redundant synchronization paths. A synchronization path redundancy value can thus be specified for the two particular stations. This also can affect a synchronization accuracy.

For example, a large number of redundant paths results in a higher synchronization path redundancy value, increasing the measure for the synchronization accuracy. The synchronization path redundancy value may be selected, for example, according to the number of stations that are present in a plurality of, or all, redundant paths.

Said synchronization path measure is determined for each station to every other station; hence there are a plurality of synchronization path measures for each station. For example, given five stations in total, there are four synchronization path measures for each station. All the synchronization path measures for a station are then used to determine for this station a synchronization metric, which specifies a measure of the synchronization accuracy of this one station in relation to all the other stations. This is carried out for all the stations; thus every station is considered here to be a potential grandmaster. Thus for each station there is a synchronization metric, which specifies a measure of how accurately the synchronization would be on selecting this station, or its clock, as the master clock. Thus the synchronization metrics of all the stations can be used to determine the station whose clock is meant to be used as the master clock. This can be done, for instance, by sorting by value in the metric.

Thus by this model-based approach to grandmaster selection, the entire synchronization hierarchy obtained for a potential grandmaster candidate can be taken into account. The method is preferably carried out offline and can therefore be used for the network design and provisioning the network. In particular, it uses connection and clock models (as parts of the aforementioned model) to represent the individual synchronization paths and hence the entire synchronization hierarchy. The proposed method is thereby suitable for use both in wired and in converged wired and wireless networks.

Finding the port states of the stations can then be solved using two approaches, for example, assuming the port states are actually meant to be determined. In one approach, starting from a given grandmaster, which has been determined by the method described above, the synchronization paths to each of the remaining stations are determined using a dedicated routing algorithm, for instance what is known as the A* routing algorithm. It should be noted here that the routing algorithm must use the same weight metric as the described method in order to establish an optimum synchronization hierarchy by setting the port state correctly. Another approach is to use the BMCA itself for configuring the port states. In this case, the grandmaster priorities (e.g. "grandmasterPriority1") of the BMCA data set are configured for each station according to the solution of the aforementioned method. In simplified terms, generally there are two different states or port states: slave and master. The port states indicate at which port a node or station receives the synchronization information (its slave port N=1) or via which port a node passes on the synchronization information (its master ports N=0, . . . , n).

The proposed method addresses the aforementioned, formerly disadvantageous aspects as follows. It takes into account the individual synchronization paths from one grandmaster candidate to the remaining slave candidates (i.e. the rest of the stations), including the connection and clock models of each node, or each connection, along the synchronization path. The connection and clock models allow different optimization objectives, for instance the availability when considering wireless connections. By virtue of the model-based grandmaster selection, the proposed procedure does not have a hierarchical decision tree, as is used by the BMCA. Therefore a manual misconfiguration weighs less heavily. In addition, it allows assistance in creating a sequence table for fast grandmaster reselection.

A computer unit according to the disclosure, for example a PC or a control unit in a network, is configured, in particular is programmed, to perform a method according to the disclosure.

In addition, it is advantageous to implement a method according to the disclosure in the form of a computer program or computer program product containing program code for performing all the method steps, because this results in particularly low costs, especially if an executing control unit is also used for other tasks and therefore is present anyway. Suitable data storage media for providing the computer program are in particular magnetic, optical and electrical storage devices such as hard disks, Flash memories, EEPROMs, DVDs and much besides. Downloading a program via a computer network (Internet, Intranet, etc.) is also possible.

Further advantages and embodiments of the disclosure are presented in the description and in the accompanying drawing.

It shall be understood that the features mentioned above and still to be explained below can be used not just in the particular combination stated but also in other combinations or in isolation without departing from the scope of the present disclosure.

BRIEF DESCRIPTION OF THE DRAWINGS

The disclosure is shown schematically in the drawing using an exemplary embodiment, and is described in detail below with reference to the drawing.

DETAILED DESCRIPTION

Figure 1:
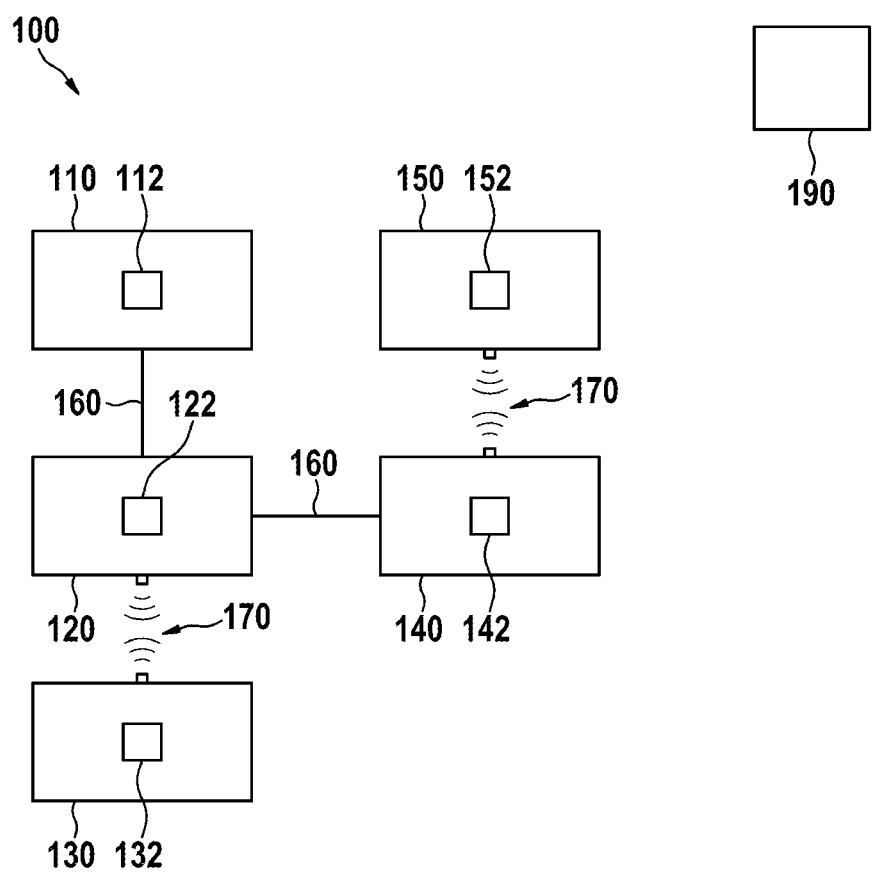
FIG. 1 shows schematically a communication network having a plurality of stations, in which a method according to the disclosure can be implemented.

FIG. 1 shows schematically a communication network 100 having a plurality of stations 110, 120, 130, 140 and 150, in which a method according to the disclosure can be implemented. Each of the stations has a clock 112, 122, 132, 142 and 152 respectively, and is communicatively connected to at least one other station via a communication connection 160 or 170. The communication connections 160 are wired communication connections such as Ethernet; the communication connections 170 are wireless communication connections such as WLAN or WiFi.

The stations may be, for example, devices or machines in an industrial environment, or computer units or control units thereof. For example, it is conceivable that the stations 130 and 150, which are linked only wirelessly, are mobile or movable stations, whereas the other stations may be stationary stations.

A computer unit 190 in the form of a PC is also shown, which can be used, for instance, to determine in the network or communication network 100 one of the stations whose clock is meant to be used as the master clock. This shall be explained below by way of example.

Figure 2:
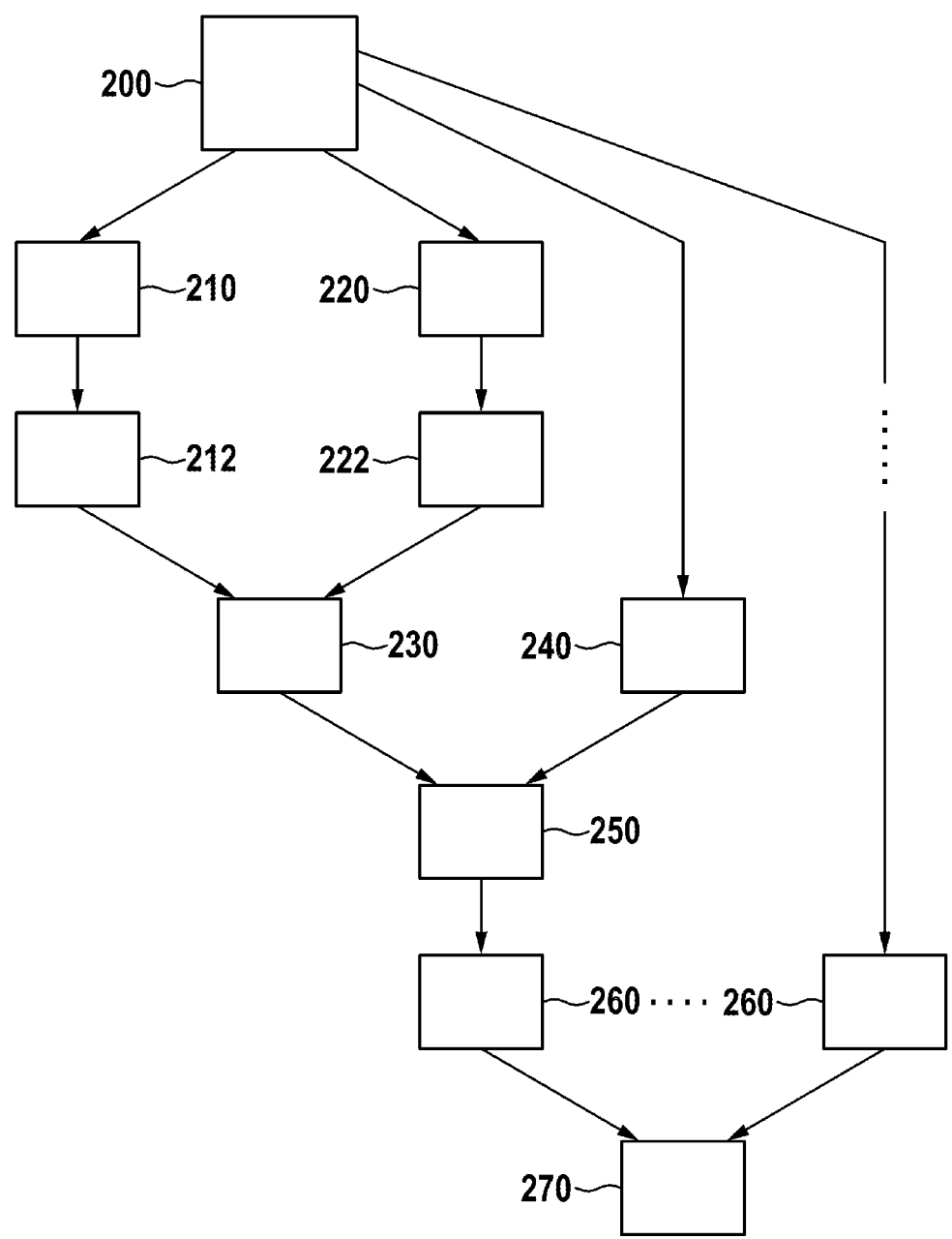
FIG. 2 shows schematically a procedure of a method according to the disclosure in a preferred embodiment.

In this regard, FIG. 2 shows schematically as a flow diagram a procedure of a method according to the disclosure in a preferred embodiment.

A network model 200 is used here to represent the network, for instance the communication network 100 of FIG. 1. The network consists of a set V of nodes and a set E of edges. A node $v \in V$ constitutes a station (e.g. one of the stations 110-150 from FIG. 1), which is assigned to a clock (e.g. one of the clocks 112-152 from FIG. 1). An edge $e \in E$ constitutes a directional (direct) connection or communication connection between two nodes (e.g. the connection 160 between the stations 110 and 120 in FIG. 1).

For a given grandmaster candidate (GMC) $vm \in V$ is hence obtained a synchronization hierarchy $H_m$. This is a set of all the synchronization paths $P_{m \to s}$ between $v_m$ and the remaining slave candidates (SCs) $v_s \in V/v_m$. In order to quantify the suitability of a given GMC $v_m$, i.e. to specify a measure of its synchronization accuracy, all the synchronization paths $P_{m \to s}$ that exist for the GMC are taken into account. The synchronization accuracy of a SC $v_s$ is influenced by the clocks of the intermediary stations and by the individual connections between $v_m$ and $v_s$. Therefore a synchronization path, for example, is defined as a sorted list of tuples $$P_{m \to s} = (\langle v_m, e_{m \to 1} \rangle, \langle v1, e1_{\to 2} \rangle, \ldots, \langle v_{i-1}, e_{i-1 \to s} \rangle).$$

A combined clock and connection model is defined in order to find a quantity or measure for the synchronization paths with regard to its implications for the synchronization accuracy. For example, it consists of a generic clock model 210 (see equation 1 below) and a generic connection model 220 (see equation 2 below):

$$w_c(i) = f_c(\ldots) \text{ where } w_c(i) \in [0,1] \tag{1}$$

$$w_l(i,j) = f_l(\ldots) \text{ where } w_l(i,j) \in [0,1] \tag{2}$$

The clock model 210 results in weights or weightings 212 for the clocks. These weights are combined, for instance, in order to define the weight 222 of a path segment (a direct connection between two stations), i.e. a tuple $\langle v_{i-1}, e_{i-1 \to i} \rangle$. This then yields the generic combined clock/connection model:

$$w_{cl}(i,j) = \lambda \cdot w_c(i) + (1-\lambda) \cdot w_l(i,j) \text{ where } w_{cl}(i,j) \in [0,1] \tag{3}$$

resulting in a combined clock/connection weight. The sum of the clock/connection weights then yields the path weight or synchronization path weight (230 in FIG. 2):

$$w_{m \to s} = \sum_{i=m}^{s-1} w_{cl}(i, i+1). \tag{4}$$

Assuming that there may be a plurality of alternative paths $P_{m \to s}^{alt}$ from $v_m$ to $v_s$, it is of interest to evaluate the redundancy of these paths, resulting in a generic redundancy valuation, or a synchronization path redundancy value (240 in FIG. 2):

$$r_m = f_r(P_{m \to s}^{all}) \text{ where } r_m \in [0,1] \tag{5}$$

In summary, using the given network model 200, it is possible to determine the weighting of the primary synchronization path $w_{m \to s}$ from a given GMC $v_m$ to each remaining slave candidate $v_s$, making it possible to find the weight of the resultant synchronization hierarchy, i.e. the totality of the primary synchronization paths. In addition, a redundancy value $r_m$ can be found for a given GMC $v_m$, which makes it possible to take into account availability aspects of a specific GMC. Altogether, this allows a synchronization path measure 250 to be determined for every possible path for each station as the potential GMC.

In addition to the generic network model, examples of the clock and connection models (see equations (6) and (7) below) and a model for determining the redundancy shall be presented. For the clock model, a subset of the existing BMCA data set can be used, namely the clock accuracy ($v_i$·acc), the clock variance ($v_i$·var) and the clock priority ($v_i$·prio). For example, the clock weight is normalized by the specified maximum values in accordance with the generic specification.

$$f_c(\ldots) = \left( \frac{v_i.acc}{\max(v_i.acc)} + \frac{v_i.\text{var}}{\max(v_i.\text{var})} \right) \cdot \frac{v_i.prio}{\max(v_i.prio)} \tag{6}$$

The connection model works similarly. It uses attributes that may influence the synchronization, namely the transmission or packet error rate ($e_{i \to j}$·err), the propagation delay or transmission delay ($e_{i \to j}$·delay) and the availability ($e_{i \to j}$·fail).

$$f_l(\ldots) = \left( \frac{e_{i \to j}.\text{err}}{\max(e_{i \to j}.\text{err})} + \frac{e_{i \to j}.\text{delay}}{\max(e_{i \to j}.\text{delay})} \right) \cdot e_{i \to j}.\text{fail} \tag{7}$$

The model for determining the redundancy works, for instance, on the basis of an algorithm in which, for all possible paths from a potential grandmaster to another station, are selected the nodes or stations therebetween that are duplicates, i.e. appear in a plurality of paths. The redundancy valuation, or the synchronization path redundancy value, is then, for example, an average of duplicate nodes across all the paths from $v_m$ to $v_s$. If, for instance, a node $v_i$ appears in all the paths from $v_m$ to $v_s$, this is a single error point.

The proposed method also uses the provided network model 200, for example, to resolve the shortcomings of the traditional BMCA. The method can be used for the network design and for provisioning the network, because it is carried out offline. The proposed method evaluates each station or node in a given network as the GMC $v_m$ by finding its resultant synchronization hierarchy metric $M_m$, or simply just synchronization metric (260 in FIG. 2). The synchronization hierarchy metric $M_m$ comprises the weights of the primary synchronization paths from GMC $v_m$ to each of the remaining SCs $v_s$, and, if applicable, other information such as the redundancy valuation $r_m$ for the GMC $v_m$. Once the synchronization hierarchy metric $M_m$ has been found for all (potential) GMCs, the metrics can be sorted. This allows the best GMC to be found, and, if applicable, suitable fallback solutions (i.e. the next-best GMCs), in a step 270.

The method is described generally by an algorithm, for example, which works as follows: For a network having a set V of nodes and a set E of edges, the method finds the synchronization metrics $M_m$ or 260 for all possible GMCs. For a GMC $v_m \in V$, the synchronization hierarchy metric is first reset to 0, for example.

Then for each resultant SCs $v_s \in V/v_m$, the method finds the shortest path $P_{m \to s}^{short}$, i.e. the path with the lowest costs, and finds the corresponding path weight $w_{m \to s}^{short}$, for instance using a dedicated routing algorithm according to Hart et al., as mentioned above. The routing algorithm uses the combined connection weight $w_{cl}(i,j)$ as the weight metric. Here $P_{m \to s}^{short}$ is the primary synchronization path for synchronization of $v_s$ by $v_m$. In addition, the method checks all possible paths $P_{m \to s}^{all}$ from $v_m$ to $v_s$.

Then the method uses $P_{m \to s}^{all}$ to evaluate the redundancy $r_{m \to s}$ between $v_m$ and $v_s$ in order to incorporate a robustness aspect for a synchronization hierarchy. The weighting of the primary synchronization path and the redundancy valuation are each stored in a dedicated vector, so for instance $w_m^{short}$ and $r_m$.

After checking all the SCs, the method uses the generic function $f_m$ to find the synchronization hierarchy metric Mm. It uses the weighting of the primary synchronization path and the redundancy valuation as the input parameters.

Then the GMC $v_m$, together with the resultant synchronization hierarchy metric $M_m$, are added as candidate metric tuples $<v_m, M_m>$ to the solution set S. This process is repeated for every potential GMC $v_m$, i.e. every node from V. After considering all possible scenarios for time-synchronization, the solution set S is sorted according to the synchronization hierarchy metric, for instance from best to worst value, so that the best GMCs and fallback candidates can be obtained.

In addition to the generic description of the procedure, equation (8) shows an example for determining the synchronization hierarchy metric $M_m$. The given examples minimize the worst-case primary synchronization paths, i.e. the primary synchronization path having the greatest weight.

$$f_m(\ldots) = (1 - (\max(w_m^{short}) \cdot \bar{r}_m)) \quad (8)$$

As mentioned, two approaches can be used to solve finding the port states. In one approach, starting from a given grandmaster GM $v_m$, which can be determined by the method mentioned, the synchronization paths to each of the remaining stations SCs $v_s$ are determined using a dedicated routing algorithm, for instance the A* routing algorithm. It should be noted that the routing algorithm must use the same weight metric as the method that is used, in order to achieve an optimum synchronization hierarchy by setting the port state correctly. Another approach is to use the BMCA itself for configuring the port states. In this case, the GM priorities ("grandmasterPriority1") of the BMCA data set are configured for each node according to the solution of the method used. For example, the best priority, i.e. 0, is assigned to the best GMC $v_i$ having $M_i = \max(M_m)$. Then the second-best priority, i.e. 1, is assigned to the second-best GMC $v_j$, and so on. Then the BCMA can be used to decide the port states.

What is claimed is:

1. A method for determining a master clock in a communication network having a plurality of stations that are communicatively connected to each other and each have a clock, wherein the master clock is used for time synchronization of the clocks of the plurality of stations, the method comprising:
   providing a model of the communication network defined by a set of nodes and a set of edges, each node in the set of nodes representing a respective station of the plurality of stations and having a respective weight assigned to the respective station, each edge in the set of edges representing a respective direct connection between two respective stations of the plurality of stations and having a respective weight assigned to the respective direct connection;
   determining, using the model of the communication network, a respective synchronization path weight for each respective synchronization path between each respective station of the plurality of stations and each respective other station of the plurality of stations, each respective synchronization path weight specifying a synchronization accuracy of the respective path, the respective synchronization path weight for each respective synchronization path being determined as a sum of the weights assigned to each intermediary station and to each direct connection along the respective synchronization path;
   determining, using the model of the communication network, a respective synchronization path redundancy value for each respective station of the plurality of stations to each respective other station of the plurality of stations, the respective synchronization path redundancy value specifying a redundancy between the respective station to the respective other station, the respective synchronization path redundancy value being determined by identifying stations that are present along multiple synchronization paths between the respective station to the respective other station;
   determining a respective synchronization metric for each respective station of the plurality of stations based on (i) the respective synchronization path weight for each respective synchronization path from the respective station and (ii) the respective synchronization path redundancy value for the respective station to each respective other station of the plurality of stations, a respective synchronization metric that specifies a synchronization accuracy for the respective station; and
   determining, on the basis of the respective synchronization metrics of all of the plurality of stations, a station of the plurality of stations whose clock is to be used as the master clock.

2. The method according to claim 1, wherein for each respective station of the plurality of stations, a clock model is used to determine the respective weight assigned to the respective station, the clock model specifying at least one of a clock accuracy, a clock variance, and a clock priority.

3. The method according to claim 1, wherein for each respective direct connection between two adjacent stations, a connection model is used to determine the respective weight assigned to the respective direct connection, the connection model specifying at least one of a transmission error rate, a transmission delay, and an availability.

4. The method according to claim 1, wherein the plurality of stations are communicatively connected to each other in at least one of a wired manner and a wireless manner.

5. The method according to claim 4, wherein the respective weights assigned to direct connections between two adjacent stations that are communicatively connected to each other in a wired manner are different from the respective weights assigned to direct connections between two adjacent stations that are communicatively connected to each other in a wireless manner.

6. A computer for determining a master clock in a communication network having a plurality of stations that are communicatively connected to each other and each have a clock, wherein the master clock is used for time synchronization of the clocks of the plurality of stations, the computer having a processor and a memory, the processor being configured to:

provide a model of the communication network defined by a set of nodes and a set of edges, each node in the set of nodes representing a respective station of the plurality of stations and having a respective weight assigned to the respective station, each edge in the set of edges representing a respective direct connection between two respective stations of the plurality of stations and having a respective weight assigned to the respective direct connection;

determine, using the model of the communication network, a respective synchronization path weight for each respective synchronization path between each respective station of the plurality of stations and each respective other station of the plurality of stations, each respective synchronization path weight specifying a synchronization accuracy of the respective path, the respective synchronization path weight for each respective synchronization path being determined as a sum of the weights assigned to each intermediary station and to each direct connection along the respective synchronization path;

determine, using the model of the communication network, a respective synchronization path redundancy value for each respective station of the plurality of stations to each respective other station of the plurality of stations, the respective synchronization path redundancy value specifying a redundancy between the respective station to the respective other station, the respective synchronization path redundancy value being determined by identifying stations that are present along multiple synchronization paths between the respective station to the respective other station;

determine a respective synchronization metric for each respective station of the plurality of stations based on (i) the respective synchronization path weight for each respective synchronization path from the respective station and (ii) the respective synchronization path redundancy value for the respective station to each respective other station of the plurality of stations, a respective synchronization metric that specifies a synchronization accuracy for the respective station; and determine, on the basis of the respective synchronization metrics of all of the plurality of stations, a station of the plurality of stations whose clock is to be used as the master clock.

7. The method according to claim 1, wherein the method is carried out by a computer program executed by a computer.

8. The method according to claim 7, wherein the computer program is stored on a non-transitory machine-readable storage medium.

* * * * *